UNITED STATES PATENT OFFICE.

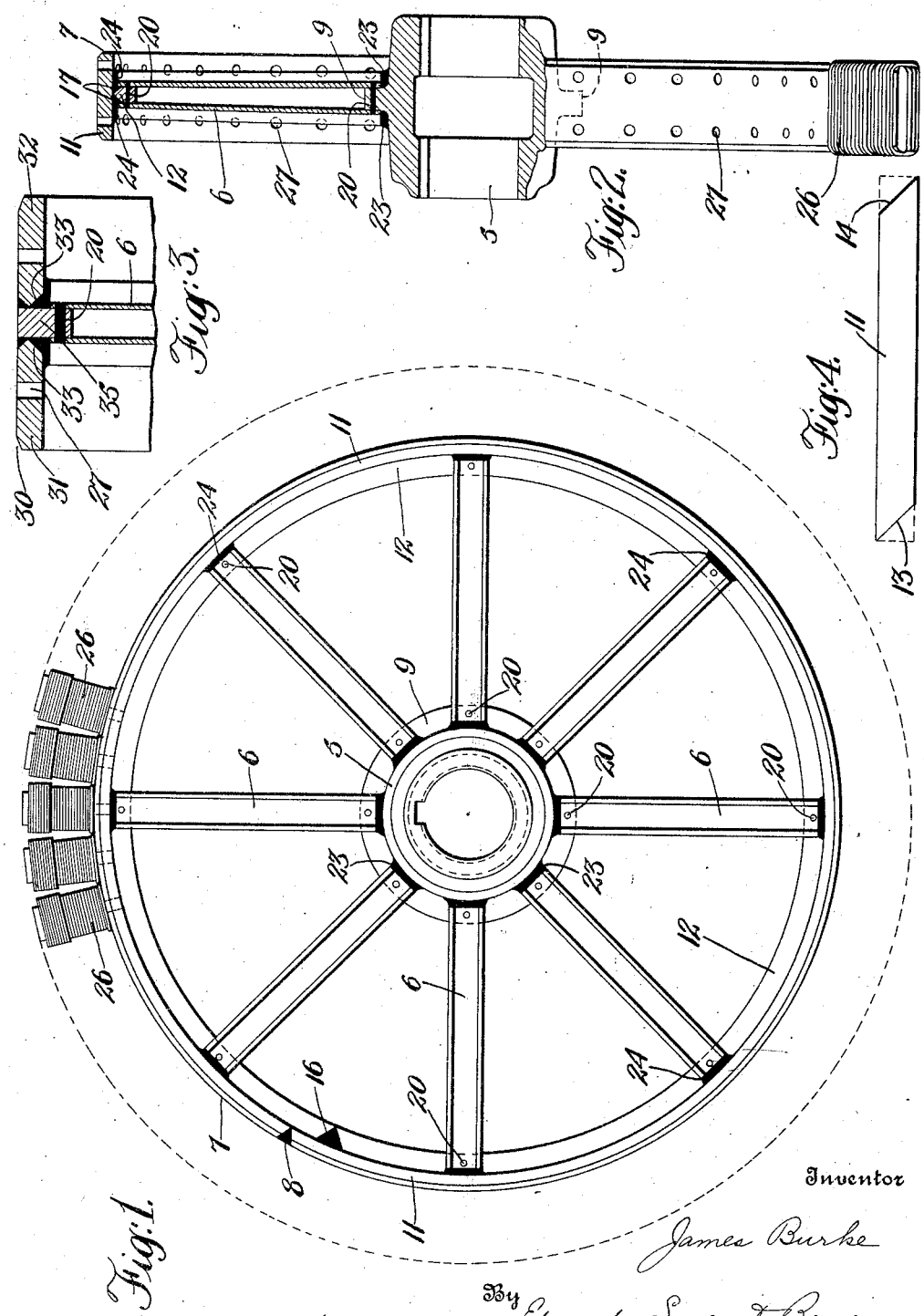

JAMES BURKE, OF ERIE, PENNSYLVANIA, ASSIGNOR TO BURKE ELECTRIC COMPANY, A CORPORATION OF PENNSYLVANIA.

ROTOR SPIDER.

1,422,414.  Specification of Letters Patent.  Patented July 11, 1922.

Application filed November 6, 1919. Serial No. 336,214.

*To all whom it may concern:*

Be it known that I, JAMES BURKE, a citizen of the United States, residing at Erie, in the county of Erie and State of Pennsylvania, have invented certain new and useful Improvements in Rotor Spiders, of which the following is a specification.

This invention relates to rotary wheels and particularly to the rotors of electrical machinery such as the rotating field spider of an alternating current generator. The chief object of the invention is to provide a wheel or spider which is built up of stock material without the formation of large castings which are heavy and expensive and difficult to make.

In the accompanying drawings showing one embodiment of the invention,

Fig. 1 is a side elevation of a dynamo rotor showing some of the field spools mounted in place.

Fig. 2 is a vertical sectional view of the same.

Fig. 3 is a partial sectional view of a modification and

Fig. 4 is a view of one of the parts before bending.

In the embodiment of the invention shown in the drawings the dynamo rotor or spider is composed of a hub 5, spokes 6 and rim or field supporting ring 7. The hub 5 is of cast metal and the remainder of the rotor frame or spider is formed of metal stock elements combined and fastened together in a rigid structure for supporting the peripheral field spools. The hub 5 is trued and finished on the outside with a central rib portion 9 machined to receive the inner ends of arms or spokes 6.

The spider rim portion 7 is composed of two portions, an outer rim 11 and an inner rim 12. The outer rim 11 is formed by bending a strip of metal stock, preferably steel, into circular form, the strip being formed as shown in Fig. 4 with ends 13, 14 cut diagonally to the sides and parallel to each other so that when bent into nearly circular form these ends will overlap and the strip may be continuously fed around through the bending rolls in each direction to bring all parts into truly circular form. The diagonal ends thus brought together are then welded along the diagonal line of junction 8 forming the complete ring. Within this outer rim is fitted and welded an inner rim or felly 12 also formed from flat stock which in this case is bent edgewise and welded as at 16 and the complete ring is then assembled within the outer rim 11 and welded in place on each side as shown at 17. The inside diameter of this felly portion is then roughly trued and the arms are fastened in place between the hub and rim by temporary bolts through the holes 20 in the parts.

The arms or spokes 6 are of steel channel beams cut to desired length and assembled in the spider with their flanges facing outwardly and their webs flat against the hub rib 9 and the inner rim or felly 12. The ends of the arms are spaced from the hub and rim 11 slightly and are welded to the hub and rib and rim and felly at 23, 24 as shown after which the temporary bolts are removed and the bolt holes 20 welded, as shown. The spider is then finally trued and machined as shown and provided with the field spools 26 bolted to the rim through holes 27 therein.

The welding of the parts preferably supplies metal to the joints by fusing of the welding electrode or metal pencil and spaces between the edges for this welding metal are provided by separating or beveling them as shown.

In Fig. 4 a modified form of rim portion is shown in which the outer rim 30 is built up of two rings 31 and 32 and formed by bending and welding similarly to rim 11 and beveled around one edge as indicated at 33 for welding one to each side of the inner rim member 35 the periphery of which in this construction extends flush with the outer surface of the rim body.

The process and apparatus of this invention provides an integral spider structure with the parts of light strong, material effecting great saving in weight and cost over the prior cast steel rotors. The parts are free from hidden flaws so frequent in castings and different sizes of rotors may be readily built up without extensive patterns for each size and type as hitherto required.

I claim:—

1. In a rotor for electrical machinery, the combination of a hub of cast metal having a central peripheral projection, channel bars radially extending therefrom welded to opposite sides of said projection and having the web of said channel bars facing said projection, a cylindrical ring of metal stock forming an outer field supporting ring, and means for fastening said ring to the ends of said bars to form a rim for said hub.

2. In a rotor for electrical machinery, the combination of a hub of cast metal having a central peripheral projection, channel bars radially extending therefrom welded to opposite sides of said projection and having the web of said channel bars facing said projection, a cylindrical ring of metal stock forming an outer field supporting ring, and means for fastening said ring to the ends of said bars to form a rim for said hub comprising an inner rim member welded to said ring and bars.

3. A rotary spider frame comprising a central hub of cast metal having a peripheral circular ridge, pairs of channel bars welded to said hub on opposite sides of said ridge with the web of the bars against said ridge, and a cylindrical rim of metal stock comprising a plurality of rings welded together, said rim being welded to said channel bars.

JAMES BURKE.